(12) United States Patent
Shin et al.

(10) Patent No.: US 12,293,488 B2
(45) Date of Patent: May 6, 2025

(54) IMAGE INPAINTING APPARATUS AND IMAGE INPAINTING METHOD

(71) Applicant: KOREA ELECTRONICS TECHNOLOGY INSTITUTE, Seongnam-si (KR)

(72) Inventors: Sa Im Shin, Seoul (KR); Bo Eun Kim, Seoul (KR); Han Mu Park, Seongnam-si (KR); Chung Il Kim, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 18/032,825

(22) PCT Filed: Nov. 4, 2022

(86) PCT No.: PCT/KR2022/017211
§ 371 (c)(1),
(2) Date: Apr. 20, 2023

(87) PCT Pub. No.: WO2024/063197
PCT Pub. Date: Mar. 28, 2024

(65) Prior Publication Data
US 2024/0378695 A1 Nov. 14, 2024

(30) Foreign Application Priority Data
Sep. 20, 2022 (KR) .................. 10-2022-0118521

(51) Int. Cl.
G06T 5/50 (2006.01)
G06T 5/77 (2024.01)
G06T 11/60 (2006.01)

(52) U.S. Cl.
CPC ............ *G06T 5/50* (2013.01); *G06T 11/60* (2013.01); *G06T 5/77* (2024.01)

(58) Field of Classification Search
None
See application file for complete search history.

(56) References Cited

U.S. PATENT DOCUMENTS

2023/0252612 A1* 8/2023 Ng .................. G06V 10/56
2024/0062345 A1* 2/2024 Kulshreshtha ........... G06T 5/77

FOREIGN PATENT DOCUMENTS

KR   10-2015-0093295 A   8/2015
KR   10-2021-0056944 A   5/2021

OTHER PUBLICATIONS

Office Action of Korean Patent Application No. 10-2022-0118521 mailed Dec. 7, 2022.

* cited by examiner

*Primary Examiner* — Yanna Wu
(74) *Attorney, Agent, or Firm* — Revolution IP, PLLC

(57) ABSTRACT

The present invention relates to an image inpainting apparatus and an image inpainting method, the image inpainting apparatus including: a background inpainting part configured to generate a background-inpainted image by carrying out inpainting on a background with respect to an input image in which a region to be inpainted is set up; an object inpainting part configured to generate an object image by carrying out inpainting on an object; and an image overlapping part configured to generate an output image by causing the background-inpainted image and the object image, which are generated, to overlap each other.

16 Claims, 14 Drawing Sheets

<INPUT IMAGE>     <BINARY IMAGE>

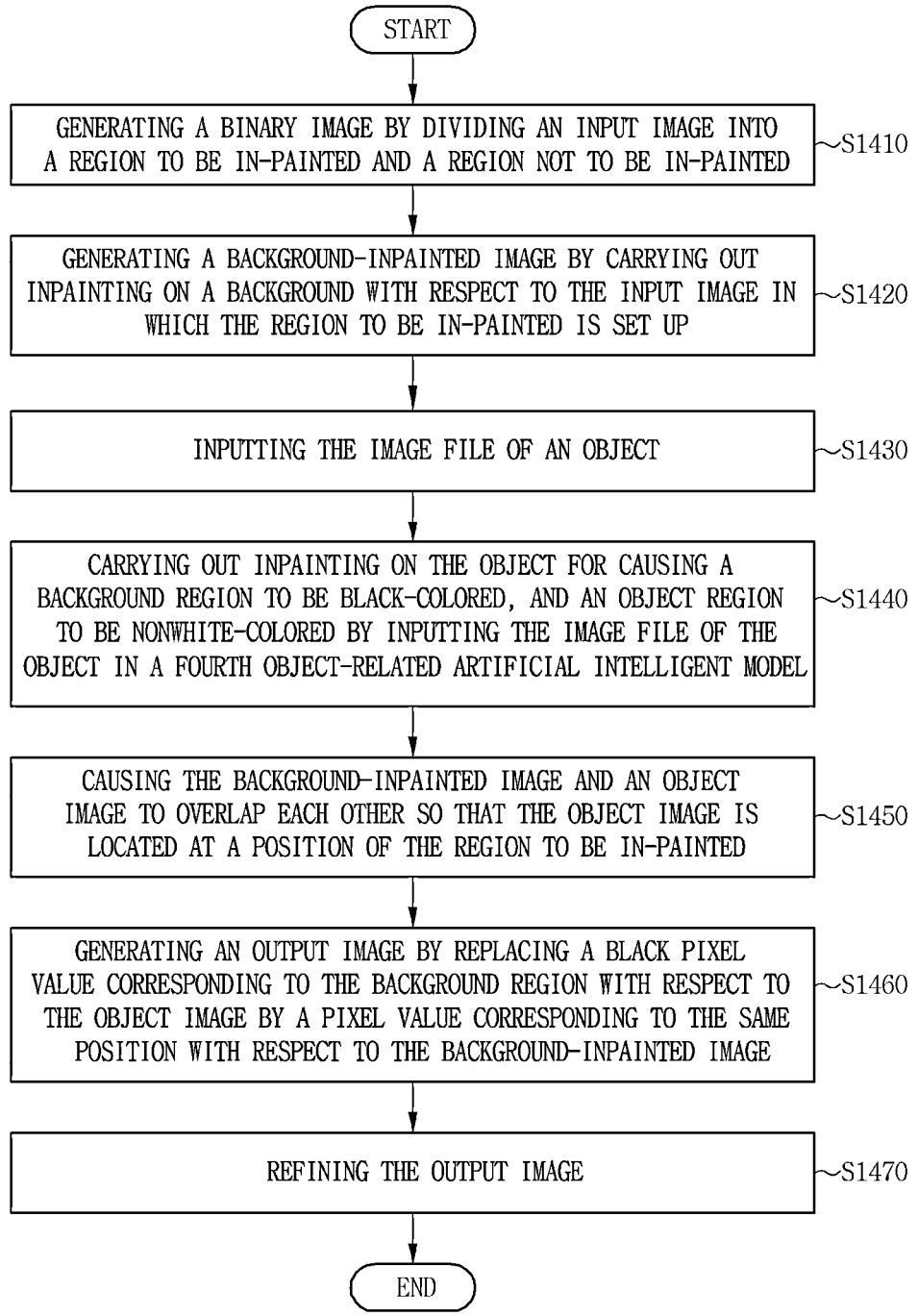

IMAGE INPAINTING APPARATUS AND IMAGE INPAINTING METHOD

TECHNICAL FIELD

The present invention relates to an image inpainting apparatus and an image inpainting method, and more particularly, to an image inpainting apparatus and an image inpainting method that are capable of generating an inpainted image by causing a background and an object to overlap each other after carrying out inpainting on each of the background and the object.

BACKGROUND ART

In general, when removing part of an image, and carrying out inpainting, existing technique has used a method of causing an object of the part removed from the image to disappear, and filling the part with a background, and in order to restore the context of an image to its original condition, or generate an image having a new context, it has been required to develop technique for generating a desired object, and putting it in a shielded part.

FIG. 1 is an exemplary view showing an inpainting technique for removing an existing object.

Referring to FIG. 1, according to the existing technique, when a category to which an object belongs is selected, an object image corresponding to the selected category is generated, and a quadrilateral image 11 in which a background is included is generated. Accordingly, when the quadrilateral image 11 generated is used in a whole image 12 as it is, this is problematic in that the quadrilateral image is not matched with region around it. That is, as illustrated in FIG. 1, since the restored region 11, and the remaining region around the restored region 11 are not matched, a feeling of heterogeneity occurs.

DETAILED DESCRIPTION OF THE INVENTION

Technical Problem

In order to solve the aforesaid problems, an object of the present invention with respect to the technical problems to be solved is to suggest an image inpainting apparatus and an image inpainting method that are capable of generating a background object at the time of carrying out inpainting on an image, and then combining them, thereby minimizing a feeling of heterogeneity by securing connectivity of the background generated by inpainting, and another background around the background even in case that the background is complicated.

Also, another other object of the present invention with respect to the technical problems to be solved is to suggest an image inpainting apparatus and an image inpainting method that are capable of generating an object suitable for a part which is shielded with respect to a whole image as a kind and property of the object to be inpainted are inputted.

The objects of the present invention with respect to the problems to be solved by the present invention are not limited to those described above, and other objects with respect to other problems to be solved should be regarded as being clearly understood by those having ordinary skill in the art based on the following description.

Solution for Solving the Problem

With respect to the technical solutions for reaching the aforesaid objects for solving the technical problems, an image inpainting apparatus according to an exemplary embodiment of the present invention comprises: a background inpainting part configured to generate a background-inpainted image by carrying out inpainting on a background with respect to an input image in which a region to be inpainted is set up; an object inpainting part configured to generate an object image by carrying out inpainting on an object; and an image overlapping part configured to generate an output image by causing the background-inpainted image and the object image, which are generated, to overlap each other.

The image inpainting apparatus further comprises a binary image generation part configured to generate a binary image by dividing the input image into the region to be inpainted, and a region not to be inpainted, wherein the background inpainting part carries out inpainting on the background by inputting the input image in which the region to be inpainted is set up, and the binary image in a background-related artificial intelligent model.

The object inpainting part generates the object image by inputting a context comprising information about a kind and attribute of the object added into the region to be inpainted in an object-related artificial intelligent model, and carrying out inpainting on the object.

The object inpainting part inputs the context in the object-related artificial intelligent model, thereby generating the object image in which a background region is black-colored, and an object region is nonwhite-colored.

The image overlapping part causes the background-inpainted image and the object image to overlap each other so that the object of the object image is located in the region to be inpainted with respect to the background-inpainted image, and the image overlapping part generates the output image by replacing a black pixel value of the background region with respect to the object image by a pixel value of the background-inpainted image.

The object inpainting part comprises: an object generation part configured to generate the object image in which the background and the object are nonwhite-colored by inputting the context in the object-related artificial intelligent model; and a masking part configured to generate an image (hereinafter referred to as "an object-masked image") in which the background region with respect to the object image generated is black-colored, and the object region is masked in a gray level.

The image overlapping part comprises: an overlapping part configured to make the background-inpainted image and the object-masked image overlap each other so that the object image and the object-masked image are located in the region to be inpainted with respect to the background-inpainted image; a pixel value calculation part configured to calculate an red-green-blue (RGB) pixel value of the object-masked image using a pixel value of the object with respect to the object image generated from the object generation part, a pixel value of the object-masked image generated from the masking part, and a pixel value of the region to be inpainted; and an output image generation part configured to generate the output image by replacing the pixel value of the object-masked image by the RGB pixel value.

The object inpainting part inputs an image file of the object in the object-related artificial intelligent model when the image file of the object added into the region to be inpainted is inputted, thereby generating the object image in which the background region is black-colored, and the object region is nonwhite-colored.

The image overlapping part generates the output image by replacing the black pixel value of the background region with respect to the object image by the pixel value of the region to be inpainted after carrying out overlapping so that the object of the object image is located in the region to be inpainted with respect to the background-inpainted image.

Meanwhile, an image inpainting method according to the other exemplary embodiment of the present invention comprises: step (A) in which an electronic apparatus generates a background-inpainted image by carrying out inpainting on a background with respect to an input image in which a region to be inpainted is set up; step (B) in which the electronic apparatus generates an object image by carrying out inpainting on an object; and step (C) in which the electronic apparatus generates an output image by making the background-inpainted image generated in said step (A), and the object image generated in said step (B) overlap each other.

The image inpainting method further comprises step (D) in which the electronic apparatus generates a binary image by dividing the input image into a region to be inpainted, and a region not to be inpainted before said step (A), wherein said step (A) shows carrying out inpainting on the background by inputting the input image in which the region to be inpainted is set up, and the binary image in a background-related artificial intelligent model.

Said step (B) shows generating the object image by inputting a context comprising information about a kind and attribute of the object added into the region to be inpainted in an object-related artificial intelligent model, and carrying out inpainting on the object.

Said step (B) shows inputting the context in the object-related artificial intelligent model, thereby generating the object image in which a background region is black-colored, and an object region is nonwhite-colored.

Said step (C) comprises: step (C1) of causing the background-inpainted image and the object image to overlap each other so that the object of the object image is located at a position of the region to be inpainted with respect to the background-inpainted image; and step (C2) of generating the output image by replacing a black pixel value of the background region with respect to the object image by a pixel value of the background-inpainted region.

Said step (B) comprises: a step of inputting the context in the object-related artificial intelligent model, thereby generating the object image in which the background and the object are nonwhite-colored; and a step of generating an object-masked image in which the background region with respect to the generated object image is black-colored, and the object region is masked in a gray level.

Said step (C) comprises: step (C1) of causing the background-inpainted image and the object-masked image to overlap each other so that the object image and the object-masked image are located in the region to be inpainted with respect to the background-inpainted image; step (C2) of calculating an RGB pixel value using a pixel value of the object with respect to the object image generated from the object generation part, and a pixel value of the object-masked image generated from the masking part; and a pixel value of the region to be inpainted; and step (C3) of generating the output image by replacing the pixel value of the object-masked image by the RGB pixel value.

Said step (B) shows inputting an image file of the object in the object-related artificial intelligent model when the image file of the object added into the region to be inpainted is inputted, thereby generating the object image in which the background region is black-colored, and the object region is nonwhite-colored.

Said step (C) shows generating the output image by replacing the black pixel value of the background region with respect to the object image by the pixel value of the region to be inpainted after carrying out overlapping so that the object of the object image is located at a position of the region to be inpainted with respect to the background-inpainted image.

Effect of the Invention

According to the present invention, since a background and an object are independently generated at the time of inpainting on an image, and are combined with each other, even in case that the background is complicated, connectivity of the background generated by inpainting and another background around the background is secured, so the image which shows that a feeling of heterogeneity is minimized can be provided.

Also, according to the present invention, as information about the kind and property of an object to be inpainted is inputted, the object suitable for a shielded part with respect to a whole image is generated, and the inpainted image can be provided by overlapping of the object and a background.

Also, according to the present invention, an object can be erased from a whole image, a desired object can also be generated, and a missing region of the whole image can be filled with the desired object, so the whole image including the objects corresponding to various contexts be can generated.

Also, according to the present invention, it can be utilized in various applications which are in need of technique for cutting a picture in a desired shape, for example, applications linked with the camera of a smart phone, image cutting tools, applications for restoring a shielded part from an image of a closed-circuit television (CCTV), or the like.

The effects of the present invention should not be limited to those mentioned above, and other effects which are not mentioned should be regarded as being clearly understood by those having ordinary skill in the art based on the description below.

BRIEF DESCRIPTION OF THE DRAWINGS

FIG. 14 is a flow chart illustrating a fourth image inpainting method carried out by the electronic apparatus according to the fourth exemplary embodiment of the present invention.

DESCRIPTION OF REFERENCE NUMERALS

Figure 1:
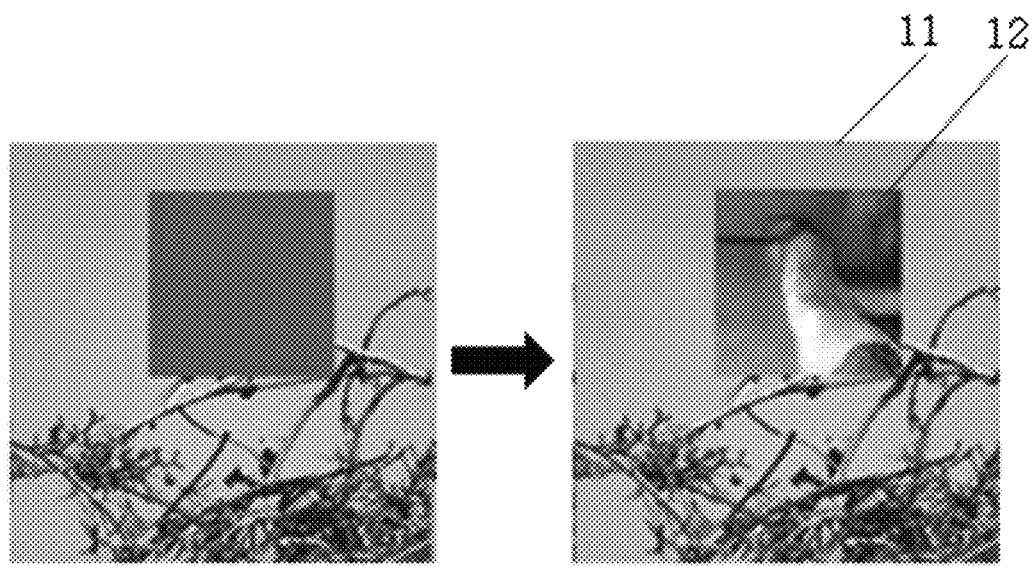
FIG. 1 is an exemplary view showing an inpainting technique for removing an existing object.

100: First Image Inpainting Apparatus
110: First Binary Image Generation Part
120: First Background Inpainting Part
130: First Object Inpainting Part
140: First Image Overlapping Part
150: First Image Refinement Part Mode for Carrying Out the Invention The objects of the present invention described above, other objects, features, and advantages will easily be understood based on the following preferable exemplary embodiments related with the accompanying drawings. However, the present invention are not limited to the exemplary embodiments described herein, but may be embodied in other forms. Rather, the exemplary embodiments introduced herein are intended for enabling the disclosed contents to be radical and complete, and for sufficiently communicating the idea of the present invention to those having ordinary skill in the art.

In previous notice, in order to prevent confusion from occurring without a special reason with respect to the description of the present invention, in any case, parts which are not largely related with the present invention, but have widely been known with regard to the description of the present invention will be omitted.

In case that the terms, such as a first term, a second term, and so on used in the present specification are intended for describing the constituent elements, these constituent elements should not be limited by these terms. These terms are only used for causing one constituent element to be distinguished from another constituent element.

Also, with respect to the embodiment of a constituent element, it should be understood that the constituent element may be embodied in various forms, like software, hardware, a combination of the software and the hardware, or the like, unless the context clearly indicates otherwise.

The terms used in the present specification are intended for describing the embodiments and are not intended to be limiting of the present invention. In the present specification, the singular forms are intended to include the plural forms as well, unless the context clearly indicates otherwise. The terms "comprises" and/or "comprising" used herein should not be construed as excluding the existence or addition of one or more other constituent elements due to any mentioned constituent element.

Also, the terms, like "part", "apparatus", and so on used in the present specification, may be intended for indicating a functional and structural combination of hardware, and software driven by the hardware, or for driving the hardware. For example, the hardware herein may be data processing equipment comprising a central processing unit (CPU) or a different processor. Also, the software driven by the hardware may indicate a processor which is in execution, an object, an executable file, a thread of execution, a program, and so on.

Also, the terms described above may mean a prescribed code, and the logical unit of hardware resources for causing the prescribed code to be carried out, and experts having ordinary skill in the technical field to which the present invention pertains will easily reason that the terms don't certainly mean a code connected physically, or do not mean one kind of hardware.

Hereinafter, the detailed technical contents to be carried out through the present invention are described in detail with reference to the accompanying drawings.

Figure 2:
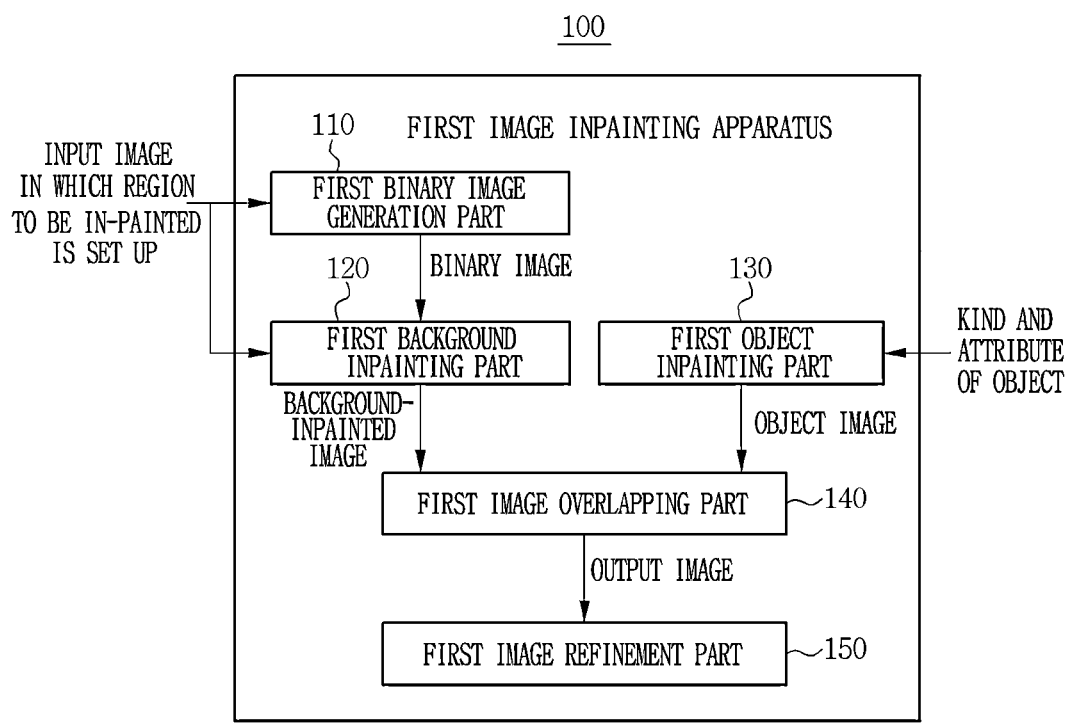
FIG. 2 is a block diagram illustrating a first image inpainting apparatus 100 according to a first exemplary embodiment of the present invention.

FIG. 2 is a block diagram illustrating a first image inpainting apparatus 100 according to a first exemplary embodiment of the present invention.

Referring to FIG. 2, the first image inpainting apparatus 100 according to the first exemplary embodiment of the present invention may comprise: a first binary image generation part 110; a first background inpainting part 120; a first object inpainting part 130; a first image overlapping part 140; and a first image refinement part 150.

The first binary image generation part 110 may generate a binary image $I_{O,1}$ by dividing an input image $I_{IN}$, in which a region to be inpainted $I_T$ is set up, into the region to be inpainted, and a region not to be inpainted.

Figure 3:
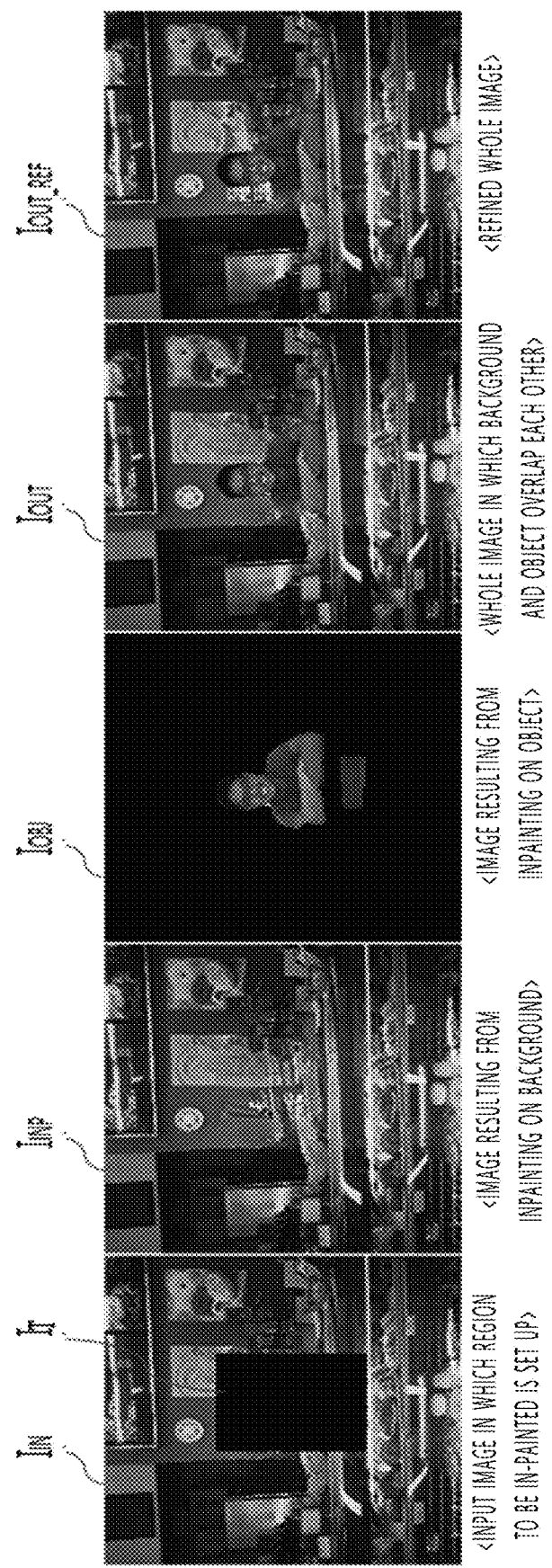
FIG. 3 is an exemplary view showing a process of carrying out inpainting on an image.
Figure 4:
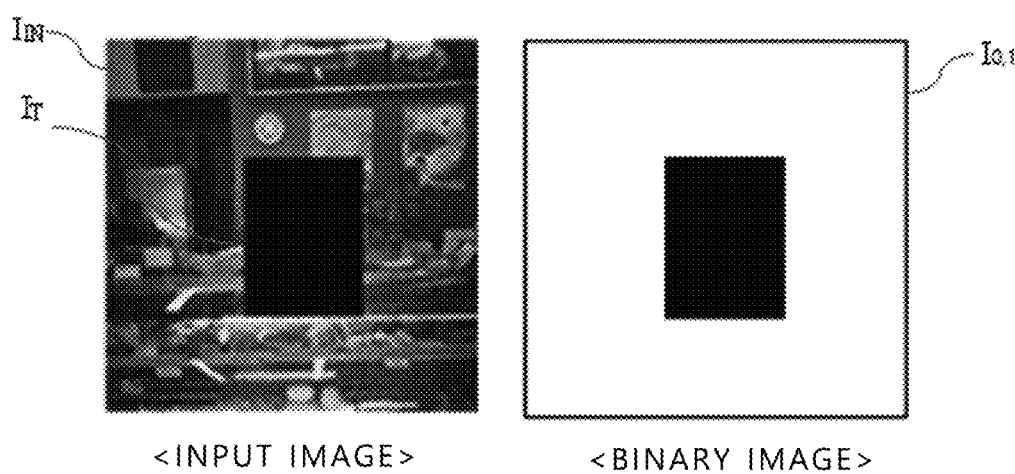
FIG. 4 is an exemplary view showing an input image $I_{IN}$ in which a region to be inpainted $I_T$ is set up, and a binary image $I_{0,1}$ generated from a first binary image generation part 110.

FIG. 3 is an exemplary view showing an image inpainting process, and FIG. 4 is an exemplary view showing the input image $I_{IN}$ in which the region to be inpainted $I_T$ is set up, and the binary image $I_{O,1}$ generated from the first binary image generation part 110.

Referring to FIG. 3 and FIG. 4, the input image $I_{IN}$ is an image resulting from removing a part $I_T$ from the original image or hiding a part of the original image, and the part IT which is removed or hidden becomes the region to be inpainted. The first binary image generation part 110 may generate the binary image $I_{O,1}$ by masking the region to be inpainted $I_T$ with respect to the input image $I_{IN}$ using value 0 representing black, and masking a region in the neighborhood $I_{IN}$-$I_T$ except the region to be inpainted IT using value 1 representing white.

The first background inpainting part 120 may generate a background-inpainted image $I_{INP}$ by carrying out inpainting on a background with respect to the input image $I_{IN}$ in which the region to be inpainted $I_T$ is set up.

In the description in detail, the first background inpainting part 120 may carry out inpainting on the background by inputting the input image $I_N$ in which the region to be inpainted $I_T$ is set up, and the binary image $I_{O,1}$ in a background-related artificial intelligent model, and may generate the background-inpainted image $I_{INP}$ as a result of carrying out the inpainting.

The background-related artificial intelligent model may be, for example, an artificial intelligent (AI) model based on deep learning, and may be a model that is learned through a computing apparatus so as to make an image, a part of which is erased while randomly changing the region to be inpainted with respect to the input image, and so as to cause the erased part to be restored by inputting the image including the erased part in an artificial intelligent network.

The first background inpainting part 120 may additionally use a method of using information about the edge or information about the structure of an image in order to operate strongly with respect to an image in which a background is complicated. When inpainting is carried out, there is a case in which the image is generated in a state of the shape of an object in the image being crushed. In order to lower this phenomenon, with respect to the method of using the information about the edge or the information about the structure, the information about the edge (an edge line) or the structure (a shape) may first be generated, and inpainting may be carried out by utilization of the generated information.

For example, the method of using the information about the edge may use a method for "image inpainting with external-internal learning and monochromic bottleneck", and the method of using the information about the structure may use a method for "image inpainting via conditional texture and structure dual generation".

Referring to FIG. 2 again, the first object inpainting part 130 may generate an image $I_{OBJ}$ including an object added into the region to be inpainted IT by carrying out inpainting on the object.

In the description in detail, the first object inpainting part 130 may carry out inpainting on the object suitable for a context by inputting the context comprising information about a kind and attribute of the object added into the region to be inpainted $I_T$ in a first object-related artificial intelligent model, thereby generating the object image $I_{OBJ}$.

The kind and attribute of the object may be selected by a user from a category through a user interface apparatus (e.g., a monitor, and a keyboard), or may be inputted directly by the user in a text form. The kind of the object may include all the objects that may be expressed as images, like houses, cars, ships, airplanes, sculptures, flowers, sparrows, people, and so on. The attribute of the object may include intuitive attributes, like materials, postures, colors, and so on, which express the objects, and abstract attributes, like being glad, being heavy, flapping, and so on.

A context may be generated from the first object inpainting part 130 in such a manner as to gather the kind and attribute of an object inputted or selected when a user inputs or selects the kind and attribute of the object via a graphic user interface (GUI) display provided by an image inpainting program. For example, when he or she inputs a text read as "a person" concerning the kind of the object, or selects a category read as "a person" from a menu, and inputs a text "lying down on the ground in a state of wearing yellow clothes" with respect to information about the attribute of the object, the first object inpainting part 130 may generate the context "a person who lies down on the ground in a state of wearing yellow clothes.

The first object-related artificial intelligent model may carry out inpainting on the object so that the object suitable for the context inputted is generated, and may carry out segmentation when the object is generated, so the object image $I_{OBJ}$ in which a background region is black-colored, and an object region is nonwhite-colored may be generated as illustrated in FIG. 3.

Describing a movement generated by leaning of the first object-related artificial intelligent model, the first object-related artificial intelligent model may be learned so as to generate the object image $I_{OBJ}$ in which a background region is black-colored, and an object region is nonwhite-colored. This is intended for regarding and using only a colorful part as the object with respect to the movement of making the background and the object overlap each other.

Pre-processing on learning data is first performed for learning of the first object-related artificial intelligent model that generates this image. The pre-processing causes the background to be black-colored in a state of only the object remaining as segmentation is carried out based on the learning data. When the artificial intelligent model (e.g., a deep learning model) learns by this learning data pre-processed, an image in which the background is black-colored, and the object is nonwhite-colored is generated even at the time of reasoning.

Figure 5:
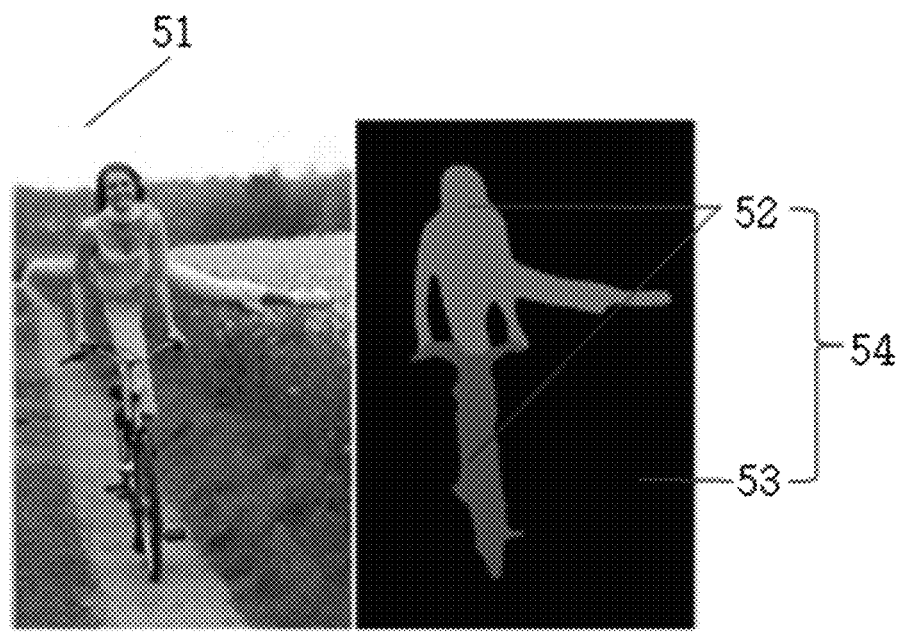
FIG. 5 is an exemplary view for explaining segmentation.

FIG. 5 is an exemplary view for explaining segmentation.

Segmentation is work for finding out the pixel of a part corresponding to a specific object from an image, and referring to FIG. 5, when a user wants to remove a background from an original image 51, segmentation algorithm is first carried out so that pixels corresponding to a person and a bicycle 52 are found, and are one-colored (in case of FIG. 5, being colored in pink and green), the remaining pixels 53 of the original image 51 are converted into black, and thus the learning data pre-processed 54 is outputted.

Then, the artificial intelligent model causes the pixels corresponding to the person and the bicycle to be converted into their original pixel values again, namely, nonwhite (not drawn) with reference to the original image 51 as the learning data pre-processed 54 is inputted.

Referring to FIG. 2 and FIG. 3 again, the first image overlapping part 140 may generate an output image $I_{OUT}$ by causing the background-inpainted image $I_{INP}$ to overlap with the object image $I_{OBJ}$ so that the object included in the object image $I_{OBJ}$ is located in the region to be inpainting IT with respect to the background-inpainted image $I_{INP}$.

The first image overlapping part 140 may adjust (resizing) a size of the object image $I_{OBJ}$ to a size of the background-inpainted image $I_{INP}$, or may set up a region of interest (ROI) where the object is included in the object image $I_{OBJ}$, and adjust a size of the region of interest set up to a size of the region to be inpainted $I_T$. To do so, information about the size of the background-inpainted image $I_{INP}$ or the region to be inpainted $I_T$, resolution, and so on may be inputted in the first image overlapping part 140.

Furthermore, the first image overlapping part 140 converts a black pixel value corresponding to the background of the object image $I_{OBJ}$ into a pixel value corresponding to the same position (an overlapping position) with respect to the background-inpainted image $I_{INP}$ after causing the background-inpainted image $I_{INP}$ and the object image $I_{OBJ}$ to overlap each other, thereby generating the output image $I_{OUT}$.

The first image refinement part 150 may refine the generated output image $I_{OUT}$ by making the output image pass through a deep learning layer so that the output image becomes natural, thereby generating an amended output image $I_{OUT\_REF}$ as shown in FIG. 3.

Figure 6:
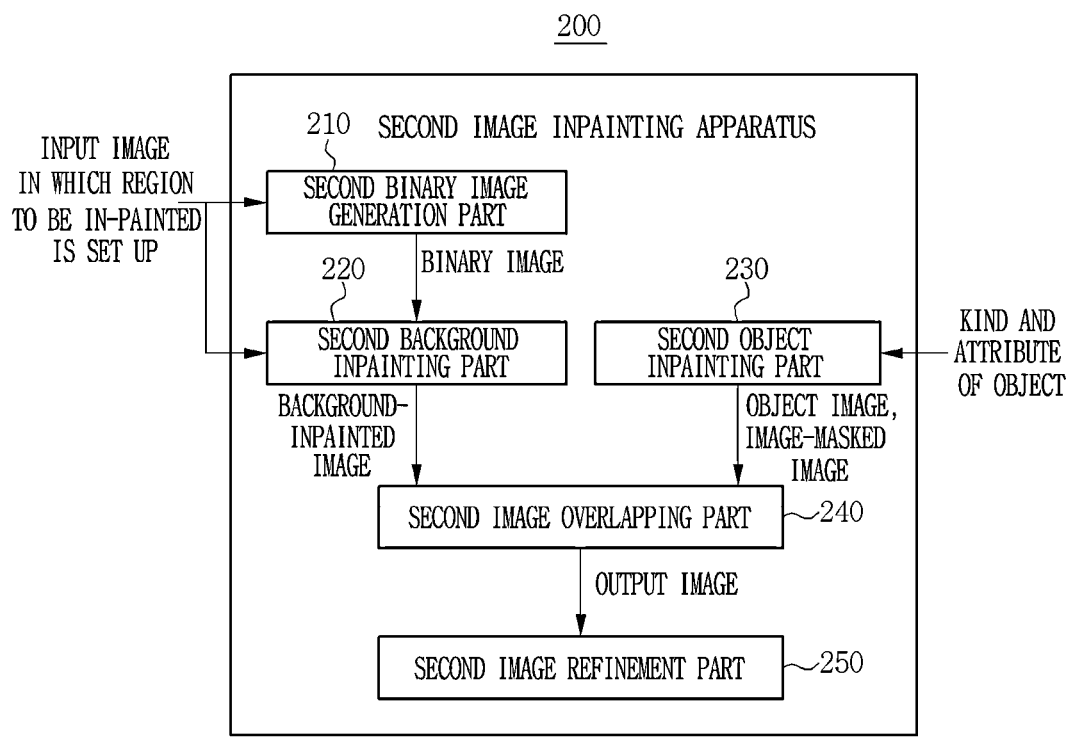
FIG. 6 is a block diagram illustrating a second image inpainting apparatus 200 according to a second exemplary embodiment of the present invention.

FIG. 6 is a block diagram illustrating a second image inpainting apparatus 200 according to a second exemplary embodiment of the present invention.

Referring to FIG. 6, the second image inpainting apparatus 200 according to the second exemplary embodiment may comprise: a second binary image generation part 210; a second background inpainting part 220; a second object inpainting part 230; a second image overlapping part 240; and a second image refinement part 250.

Movements of the second binary image generation part 210, the second background inpainting part 220, and the second object inpainting part 230, the second image overlapping part 240, and the second image refinement part 250 illustrated in FIG. 6 may be similar to or identical with those of the first binary image generation part 110, the first background inpainting part 120, and the first object inpainting part 130, the first image overlapping part 140, and the first image refinement part 150 described with reference to FIG. 2 to FIG. 5. Accordingly, for convenience of the description, the description of the overlapping parts will be omitted.

The second binary image generation part 210, as described with reference to FIG. 4, may generate the binary image $I_{0,1}$ by dividing the input image $I_{IN}$, in which the region to be inpainted is set up, into the region to be inpainting $I_T$ and the region not to be inpainting $I_{IN\_IT}$.

The second background inpainting part 220 may carry out inpainting on the background by inputting the input image $I_{IN}$ in which the region to be inpainted $I_T$ is set up, and the binary image $I_{0,1}$ in the background-related artificial model, thereby generating the background-inpainted image $I_{INP}$.

The second object inpainting part 230 may generate an object image $I_{OBJ\_C}$ added into the region to be inpainted $I_T$ by carrying out inpainting on the object.

Figure 7:
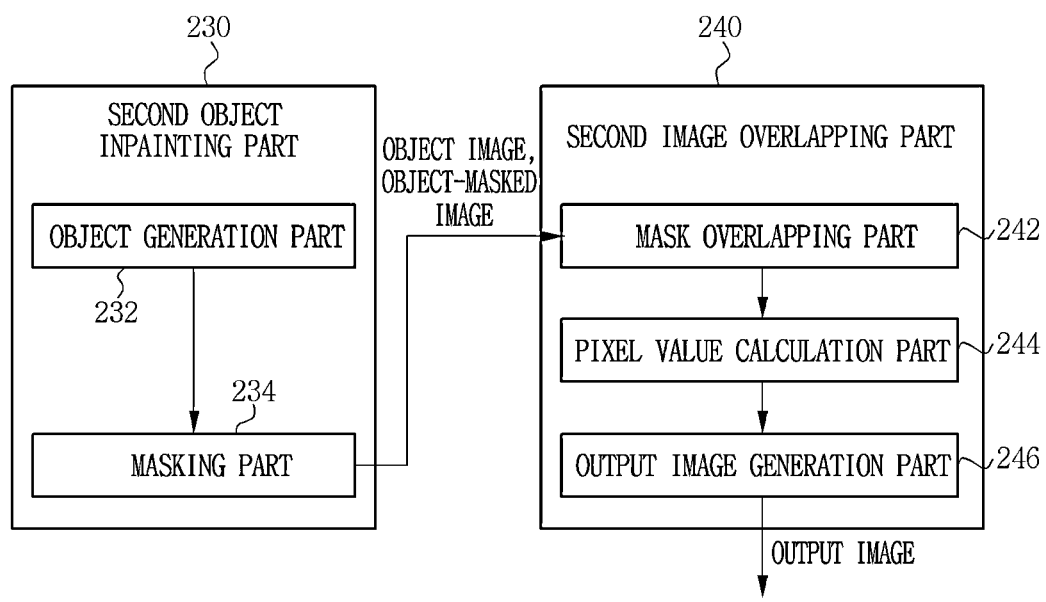
FIG. 7 is a block diagram illustrating a second object inpainting part 230 and a second image overlapping part 240 in detail.
Figure 8:
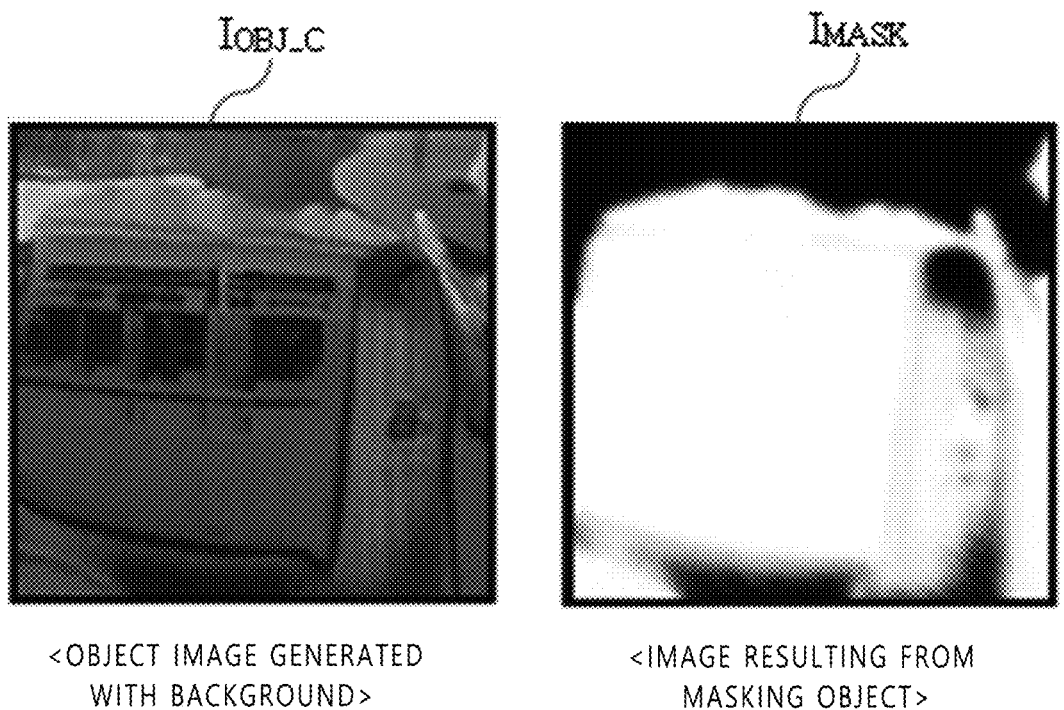
FIG. 8 is an exemplary view for explaining a movement of the second object inpainting part 230.

FIG. 7 is a block diagram illustrating the second object inpainting part 230 and the second image overlapping part 240 in detail, and FIG. 8 is an exemplary view for explaining a movement of the second object inpainting part 230.

Referring to FIG. 7 and FIG. 8, the second object inpainting part 230 comprises an object generation part 232 and a masking part 234.

When information about the kind and attribute of an object added into the region to be inpainted $I_T$ is inputted, the object generation part 232 may generates a context suitable for the kind and attribute of the object, input it in a second object-related artificial intelligent model, and generate an object image $I_{OBJ\_C}$ as shown in FIG. 8 by carrying out inpainting on the object suitable for the context. At this time, the object generation part 232 or the second object-related artificial intelligent model may generate the object image $I_{OBJ\_C}$ in which all the background and object are nonwhite-colored.

With respect to the object image $I_{OBJ\_C}$ generated from the object generation part 232, the masking part 234 may generate, as shown FIG. 8, an image (hereinafter referred to as "an object-masked image") $I_{MASK}$ in which a background region is black-colored, and an object region is treated in a gray level.

Accordingly, a pixel corresponding to the background with respect to the object-masked image $I_{MASK}$ has value 0 representing black, and each pixel corresponding to the objects has a value ranging from 0 (black) to 1 (white), namely, values representing black, white, and gray.

Referring to FIG. 6 again, the second image overlapping part 240 may generate the output image IOUT by providing the pixel values after causing the background-inpainted image $I_{INP}$, the object image $I_{OBJ\_C}$, and the object-masked image $I_{MASK}$ to overlap with one another.

To do so, the second image overlapping part 240 may comprise: a mask overlapping part 242; a pixel value calculation part 244; and an output image generation part 246.

The mask overlapping part 242 may cause the background-inpainted image $I_{INP}$, the object image $I_{OBJ\_C}$, and the object-masked image $I_{MASK}$ to overlap with one another so that the object image $I_{OBJ\_C}$ and the object-masked image $I_{MASK}$ are located in the region to be inpainted $I_T$ with respect to the background-inpainted image $I_{INP}$.

In the description in detail, the mask overlapping part 242 may adjust each size of the object image $I_{OBJ\_C}$ and the object-masked image $I_{MASK}$ to a size of the region to be inpainted $I_T$ so that their respective sizes can be consistent with the size of the region to be inpainted $I_T$, and may cause the object image $I_{OBJ\_C}$ and the object-masked image $I_{MASK}$ whose sizes are each adjusted to that of the region to be inpainted $I_T$ to overlap each other. When their respective sizes get larger or smaller than their original sizes, the mask overlapping part 242 carries out interpolation so that quality of the images can be improved.

The pixel value calculation part 244 may calculate a red-green-blue (RGB) pixel value of the object-masked image $I_{MASK}$ using the pixel value of the object with respect to the object image $I_{OBJ\_C}$ generated from the object generation part 232, the pixel value of the object-masked image $I_{MASK}$, and the pixel value of the region to be inpainted $I_T$.

Mathematical Formula 1 is a formula for calculating an RGB pixel value for a pixel located at (x, y) among pixels located in the object-masked image $I_{MASK}$.

$$P(x, y) = \text{object pixel value }(x, y) \times \text{mask pixel value }(x, y) + \text{background pixel value }(x, y) \times (1 - \text{mask pixel value }(x, y)) \quad \text{[Mathematical Formula 1]}$$

In Mathematical Formula 1, p (x, y) represents an RGB pixel value for a pixel located at (x, y), the object pixel value (x, y) represents an RGB pixel value for a pixel located at (x, y) with respect to the object image $I_{OBJ\_C}$ illustrated in FIG. 8, and the mask pixel value (x, y) represents a gray level shown at the position (x, y) with respect to the object-masked image $I_{MASK}$ illustrated in FIG. 8.

When all the pixel values for the pixels located at positions ranging from (0, 0) to (x, y) of the object-masked image $I_{MASK}$ are calculated, the output image generation part 246 may generate the output image $I_{OUT}$ by replacing the pixel values of the object-masked image $I_{MASK}$ by respective RGB pixel values of the pixels calculated through Mathematical Formula 1.

The second image refinement part 250 may refine the output image $I_{OUT}$ generated from the output image generation part 246, thereby generating the amended output image $I_{OUT\_REF}$.

Figure 9:
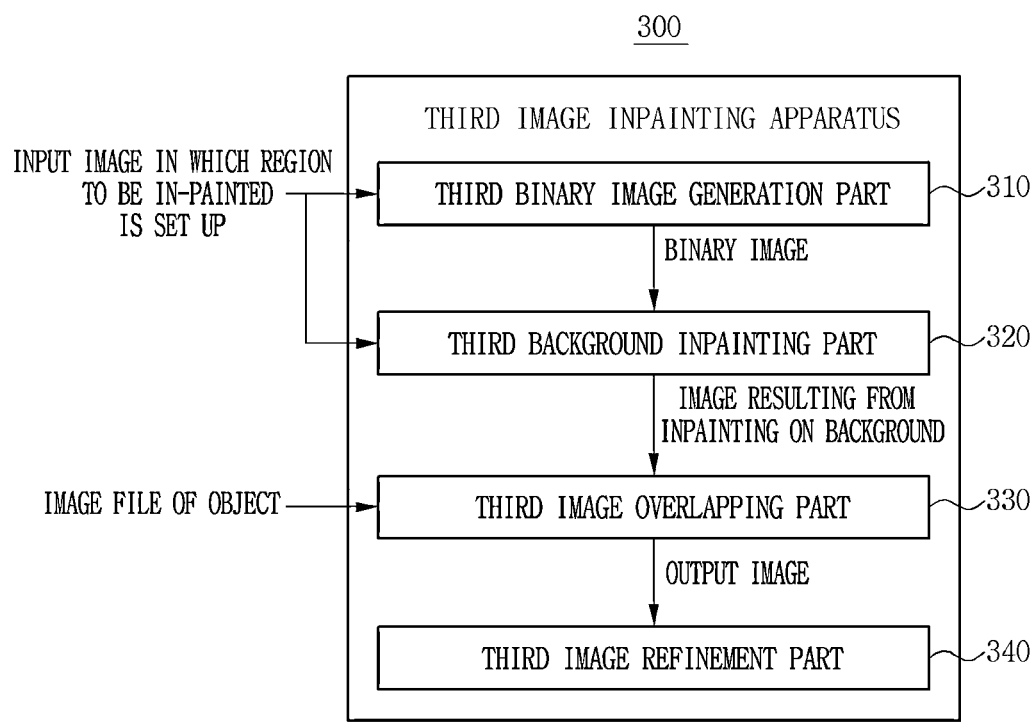
FIG. 9 is a block diagram illustrating a third image inpainting apparatus 300 according to a third exemplary embodiment of the present invention.

FIG. 9 is a block diagram illustrating a third image inpainting apparatus 300 according to a third exemplary embodiment of the present invention.

Referring to FIG. 9, the third image inpainting apparatus 300 according to the third exemplary embodiment may comprise: a third binary image generation part 310; a third background inpainting part 320; a third image overlapping part 330; and a third image refinement part 340.

Movements of the third binary image generation part 310, the third background inpainting part 320, and the third image overlapping part 330, and the third image refinement part 350 illustrated in FIG. 9 may be similar to or identical with those of the first binary image generation part 110, the first background inpainting part 120, and the first object inpainting part 130, the first image overlapping part 140, and the first image refinement part 150 described with reference to FIG. 2 to FIG. 5. Accordingly, for convenience of the description, the description of the overlapping parts will be omitted.

As described with reference to FIG. 4, the third binary image generation part 310 may generate the binary image $I_{0,1}$ by dividing the input image $I_{IN}$, in which the region to be inpainted $I_T$ is set up, into the region to be inpainted and the region not to be inpainted $I_{IN\_IT}$.

The third background inpainting part 320 may carry out inpainting on a background by inputting the input image $I_{IN}$ in which the region to be inpainted $I_T$ is set up, and the binary image $I_{0,1}$ in the background-related artificial intelligent model, thereby generating the background-inpainted image $I_{INP}$.

The third image overlapping part 330 may receive the background-inpainted image $I_{INP}$ inputted from the third background inpainting part 320, and may receive the image file of an object added into the region to be inpainted $I_T$. The image file of the object may be selected as a user operates a user interface apparatus, and the background may be black-colored as shown in the object image $I_{OBJ}$ illustrated in FIG. 3.

After adjusting a size of the image of the object image file to a size of the background-inpainted image $I_{INP}$, or a size of the region to be inpainted $I_T$, the third image overlapping part 330 may generate the output image $I_{OUT}$ by causing the image of the object image file whose size is adjusted, and the background-inpainted image $I_{INP}$ to overlap each other.

The third image refinement part 340 may generate the amended output image $I_{OUT\_REF}$ by refining the output image $I_{OUT}$ generated from the third image overlapping part 330.

Figure 10:
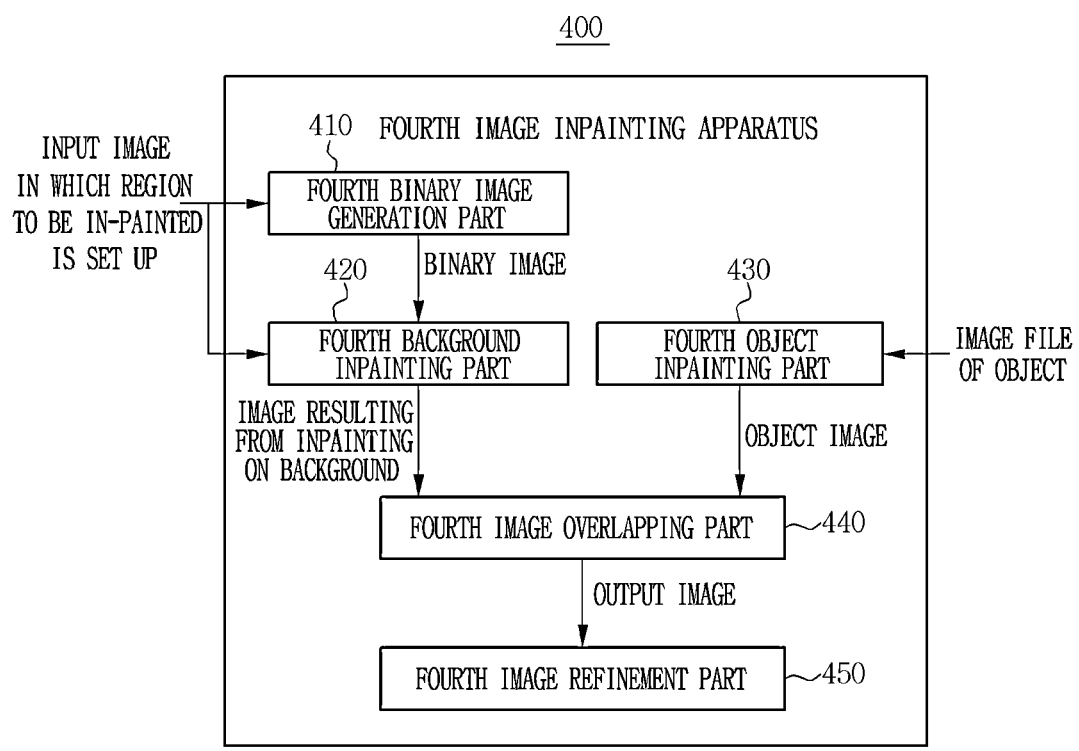
FIG. 10 is a block diagram illustrating a fourth image inpainting apparatus 400 according to a fourth exemplary embodiment of the present invention.

FIG. 10 is a block diagram illustrating a fourth image inpainting apparatus 400 according to a fourth exemplary embodiment of the present invention.

Referring to FIG. 10, the fourth image inpainting apparatus 400 according to the fourth exemplary embodiment may comprise: a fourth binary image generation part 410; a fourth background inpainting part 420; a fourth object inpainting part 430; a fourth image overlapping part 440; and a fourth image refinement part 450.

Movements of the fourth binary image generation part 410, the fourth background inpainting part 420, and the fourth object inpainting part 430, the fourth image overlapping part 440, and the fourth image refinement part 450 illustrated in FIG. 10 may be similar to or identical with those of the first binary image generation part 110, the first background inpainting part 120, and the first object inpainting part 130, the first image overlapping part 140, and the first image refinement part 150 described with reference to FIG. 2 to FIG. 5. Accordingly, for convenience of the description, the description of the overlapping parts may be omitted.

The fourth binary image generation part 410 may generate the binary image $I_{0,1}$ from the input image $I_{IN}$ in which the region to be inpainted $I_T$ is set up.

The fourth background inpainting part 420 may carry out inpainting on a background by inputting the input image $I_{IN}$ in which the region to be inpainted $I_T$ is set up, and the binary image $I_{0,1}$ in the background-related artificial intelligent model, and may generate the background-inpainted image $I_{INP}$ as a result of carrying out the inpainting.

When the image file of an object is inputted, the fourth object inpainting part 430 may carry out inpainting on the object by inputting an image of the object corresponding to the file in a fourth object-related artificial intelligent model, thereby generating the object image $I_{OBJ}$.

The fourth object-related artificial intelligent model may carry out segmentation with respect to the image of the object inputted, and may generate, as illustrated in FIG. 3, the object image $I_{OBJ}$ in which a background region with respect to the image of the object is black-colored, and an object region is nonwhite-colored.

The fourth image overlapping part 440 may adjust a size of the object image $I_{OBJ}$ to a size of the background-inpainted image $I_{INP}$, or may set up a region of interest (ROI) in which an object is included in the object image $I_{OBJ}$, and adjust a size of the region of interest set up to a size of the region to be inpainted $I_T$.

Furthermore, after causing the background-inpainted image $I_{INP}$ and the object image $I_{OBJ}$ whose respective sizes are adjusted to overlap each other, the fourth image overlapping part 440 may generate the output image $I_{OUT}$ by converting a black pixel value corresponding to the background of the object image $I_{OBJ}$ into a pixel value corresponding to the same position with respect to the background painting image $I_{INP}$. The fourth image overlapping part 400 may carry out overlapping by adjusting each size so that the object of the object image $I_{OBJ}$ is located in the region to be inpainted $I_T$ with respect to the background-inpainted image $I_{INP}$.

The fourth image refinement part 450 may refine the generated output image $I_{OUT}$ by causing the output image to pass through a deep learning layer, so the amended output image $I_{OUT\_REF}$ may be generated as shown in FIG. 3.

According to various exemplary embodiments of the present invention as described above, the present invention may carry out inpainting on the object based on the context, or carry out inpainting on the object based on the image file of the object, or in case that the background of the image file of the object is clearly distinguished from the object, inpainting on the object may be omitted. Also, heterogeneity occurring between the inpainted background and another background around it may be solved in such a manner as to carry out inpainting on the background and inpainting on the object independently, and then to cause the inpainted images to overlap each other.

Figure 11:
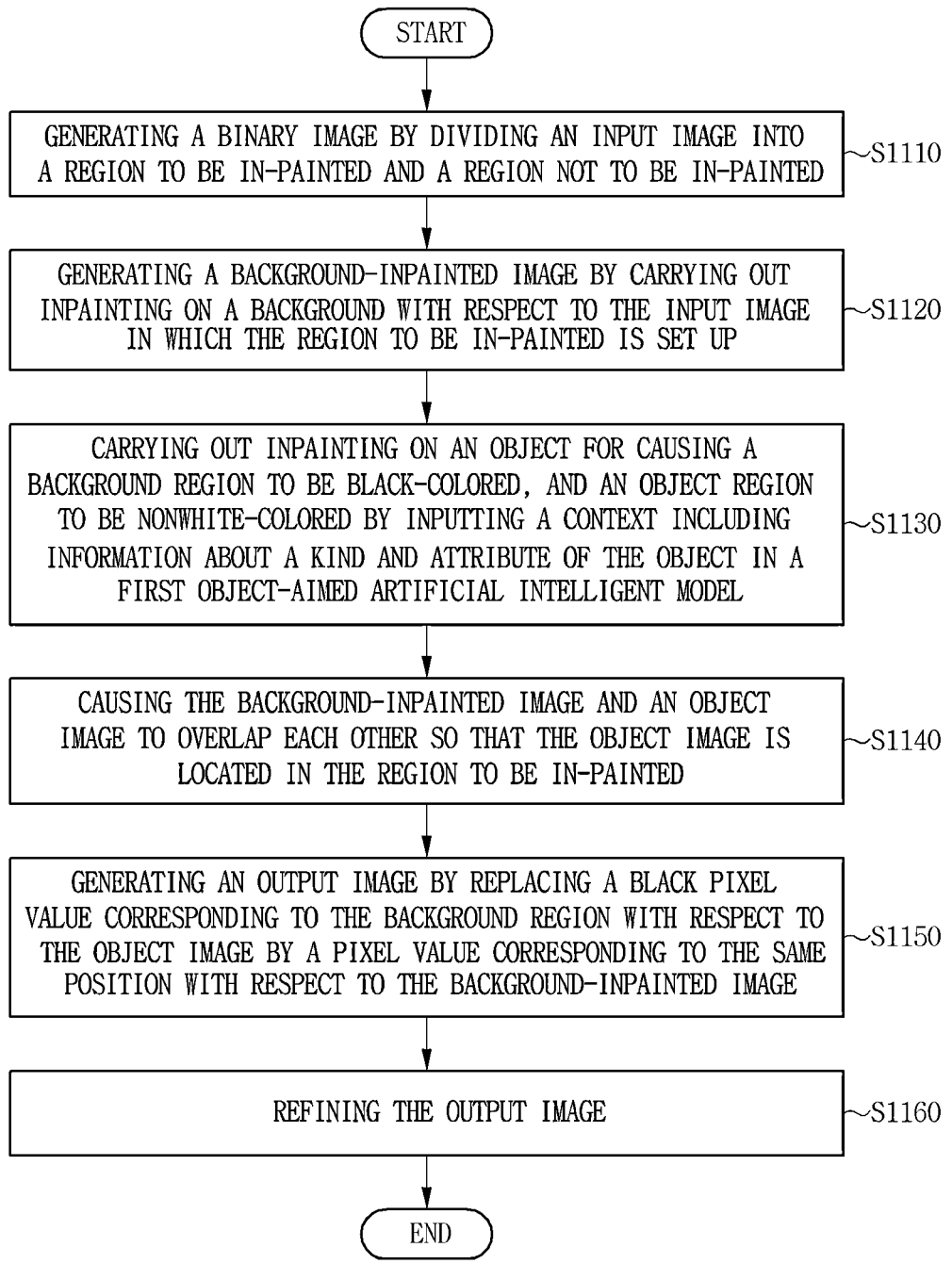
FIG. 11 is a flow chart illustrating a first image inpainting method carried out by the electronic apparatus according to the first exemplary embodiment of the present invention.

FIG. 11 is a flow chart illustrating a first image inpainting method carried out by the electronic apparatus according to the first exemplary embodiment of the present invention.

The electronic apparatus of carrying out the image inpainting method illustrated in FIG. 11 may be the first image inpainting apparatus 100 described with reference to FIG. 2 to FIG. 5.

Referring to FIG. 11, the first image inpainting apparatus 100 may generate the binary image $I_{0,1}$ by dividing the input image $I_N$, in which the region to be inpainted $I_T$ is set up, into the region to be inpainted, and the region not to be inpainted S1110.

The first image inpainting apparatus 100 may carry out inpainting on the background by inputting the input image $I_{IN}$ in which the region to be inpainted $I_T$ is set up, and the binary image $I_{0,1}$ in the background-related artificial intelligent model, and may generate the background-inpainted image $I_{INP}$ S1120.

The first image inpainting apparatus 100 may carry out inpainting on the object suitable for a context by inputting the context comprising the kind and attribute of the object added into the region to be inpainted $I_T$, thereby generating the object image $I_{OBJ}$ S1130. In step S1130, in order to generate the object suitable for the context inputted, segmentation is carried out at the time of generation of the object so that the object image $I_{OBJ}$ in which the background region is black-colored, and the object image region is nonwhite-colored can be generated as shown in FIG. 3.

The first image inpainting apparatus 100 may cause the background-inpainted image $I_{INP}$ and the object image $I_{OBJ}$ to overlap each other (i.e., overlapping) so that the object image $I_{OBJ}$ is located in the region to be inpainted $I_T$ with respect to the background-inpainted image $I_{INP}$ S1140.

The first image inpainting apparatus 100 may generate the output image $I_{OUT}$ by changing the black pixel value corresponding to the background of the object image $I_{OBJ}$ which overlaps to a pixel value corresponding to the same position (a corresponding position) with respect to the background-inpainted image $I_{INP}$ S1150.

The first image inpainting apparatus 100 may generate the amended output image $I_{OUT\_REF}$ by refining the output image $I_{OUT}$ generated S1160.

Figure 12:
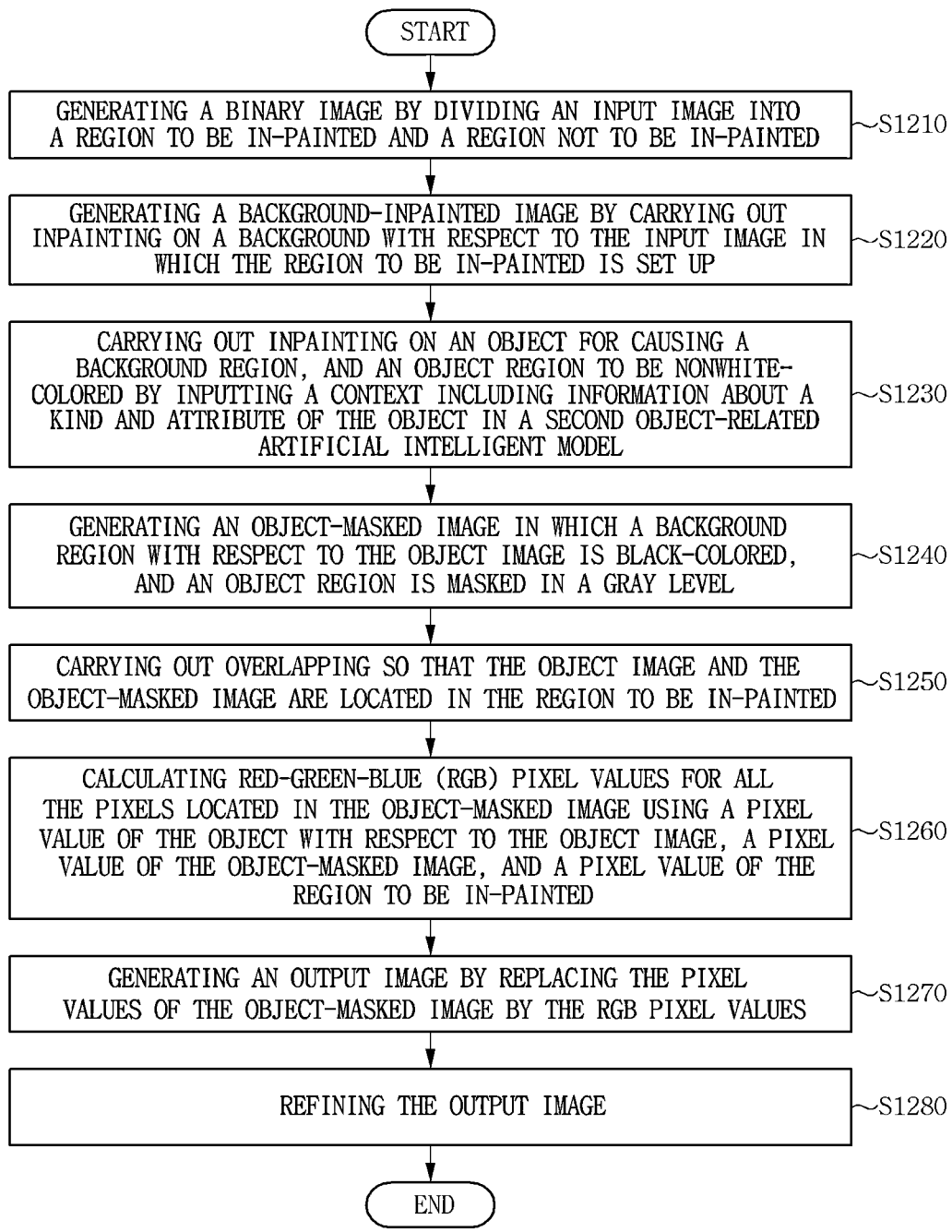
FIG. 12 is a flow chart illustrating a second image inpainting method carried out by the electronic apparatus according to the according to the second exemplary embodiment of the present invention.

FIG. 12 is a flow chart illustrating a second image inpainting method carried out by the electronic apparatus according to the second exemplary embodiment of the present invention.

The electronic apparatus of carrying out the image inpainting method illustrated in FIG. 12 may be the third image inpainting apparatus 300 described with reference to FIG. 6 to FIG. 8.

Referring to FIG. 12, the third image inpainting apparatus 300 may generate the binary image $I_{0,1}$ from the input image $I_{IN}$ in which the region to be inpainted $I_T$ is set up S1210.

The second image inpainting apparatus 200 may carry out inpainting on the background by inputting the input image $I_{IN}$ in which the region to be inpainted $I_T$ is set up, and the binary image $I_{0,1}$ in the background-related artificial intelligent model, and may generate the background-inpainted image $I_{INP}$ S1220.

The second image inpainting apparatus 200 may carry out inpainting on the object by inputting the context of the object added into the region to be inpainted $I_T$ in the second object-related artificial intelligent model, and as a result thereof, the second image inpainting apparatus may generate, as shown in FIG. 8, the object image $I_{OBJ\_C}$ in which both the background and the object are nonwhite-colored S1230.

With respect to the object image $I_{OBJ\_C}$ generated in step S1230, the second image inpainting apparatus 200 may generate, as shown in FIG. 8, the object-masked image $I_{MASK}$ in which the background region is black-colored, the object region is treated in a gray level S1240.

The second image inpainting apparatus 200 may cause the background-inpainted image $I_{INP}$, the object image $I_{OBJ\_C}$, and the object-masked image $I_{MASK}$ to overlap with one another so that the object image $I_{OBJ\_C}$ and the object-masked image $I_{MASK}$ are located in the region to be inpainted with respect to the background-inpainted image $I_{INP}$ S1250.

The second image inpainting apparatus 200 may calculate the RGB pixel values of the object-masked image $I_{MASK}$ using the pixel value of the object with respect to the object image $I_{OBJ\_C}$, the pixel values of the object-masked image $I_{MASK}$ generated from the masking part 234, and the pixel value of the region to be inpainted $I_T$ by utilizing Mathematical Formula 1 S1260. In step S1260, the pixel values for all the pixels ranging from (0, 0) to (x, y) located in the object-masked image $I_{MASK}$ are calculated.

The second image inpainting apparatus 200 may generate the output image $I_{OUT}$ in such a manner as to substitute the pixels matched with the object-masked image $I_{MASK}$ by the pixel values calculated in step S1260 for the pixels located at positions ranging from (0, 0) to (x, y) located in the object-masked image, respectively S1270.

The second image inpainting apparatus 200 may refine the output image $I_{OUT}$ generated in step S1270, thereby generating the amended output image $I_{OUT\_REF}$ S1280.

Figure 13:
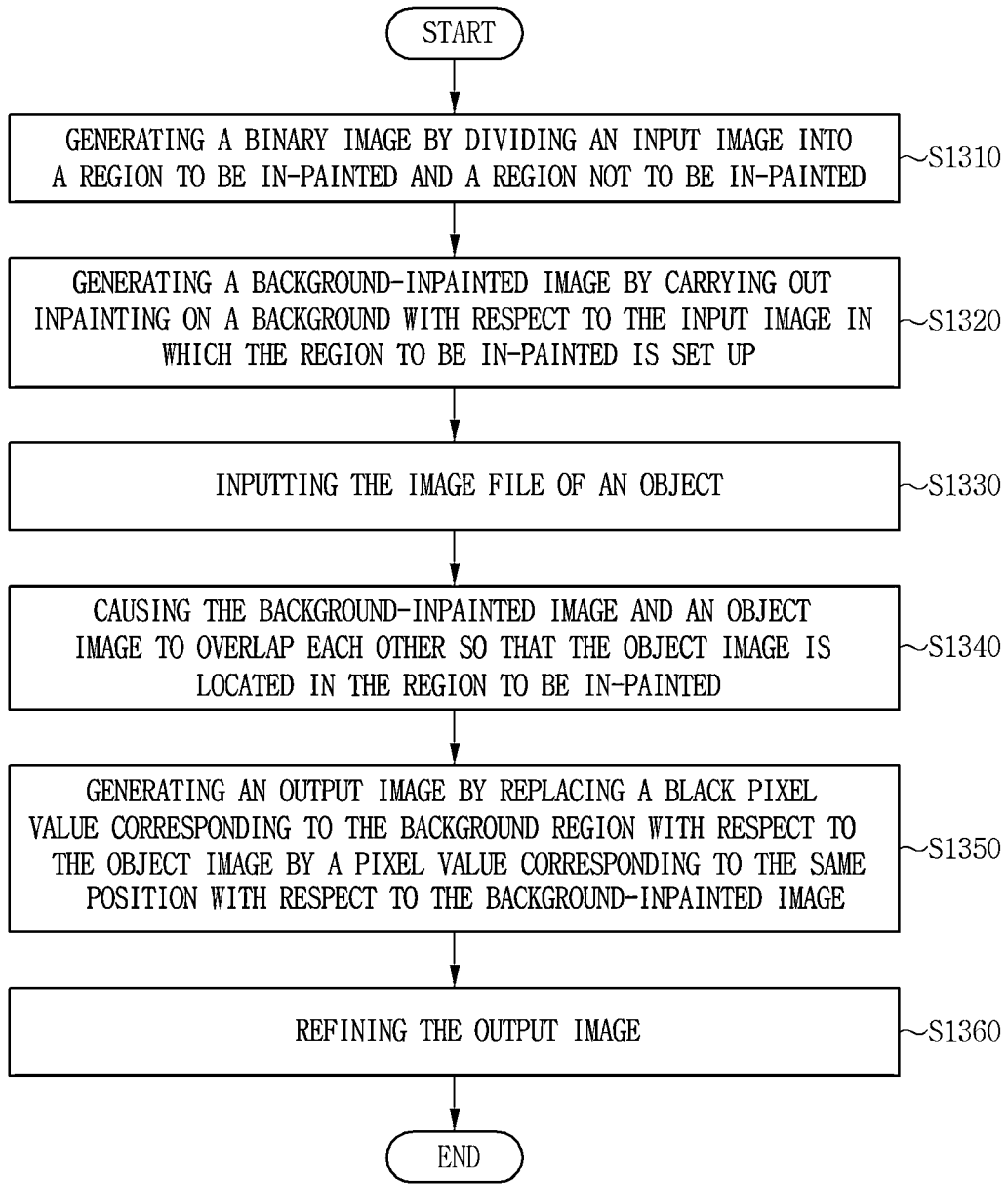
FIG. 13 is a flow chart illustrating a third image inpainting method carried out by the electronic apparatus according to the third exemplary embodiment of the present invention.

FIG. 13 is a flow chart illustrating a third image inpainting method carried out by the electronic apparatus according to the third exemplary embodiment of the present invention.

The electronic apparatus of carrying out the image inpainting method illustrated in FIG. 13 may be the third image inpainting apparatus 300 described with reference to FIG. 9.

Referring to FIG. 13, the third image inpainting apparatus 300 may generate the binary image $I_{0,1}$ from the input image $I_{IN}$ in which the region to be inpainted $I_T$ is set up S1310.

The third image inpainting apparatus 300 may carry out inpainting on the background by inputting the input image $I_{IN}$ in which the region to be inpainted $I_T$ is set up, and the binary image $I_{0,1}$ in the background-related artificial intelligent model, and may generate the background-inpainted image $I_{INP}$ S1320.

When the image file of the object added into the region to be inpainted $I_T$ is inputted S1330, the third image inpainting apparatus 300 may generate the output image $I_{OUT}$ by making the image of the object image file and the background-inpainted image $I_{INP}$ generated in step S1320 overlap each other S1340 and S1350. The image file of the object inputted in step S1330 may be an image in which a background is black-colored.

The third image inpainting apparatus 300 may refine the output image $I_{OUT}$ generated in step S1350, and may generate the amended output image $I_{OUT\_REF}$ S1360.

FIG. 14 is a flow chart illustrating a fourth image inpainting method carried out by the electronic apparatus according to the fourth exemplary embodiment of the present invention.

The electronic apparatus of carrying out the image inpainting method illustrated in FIG. 13 may be the third image inpainting apparatus 300 described with reference to FIG. 9.

Referring to FIG. 14, the fourth image inpainting apparatus 400 may generate the binary image $I_{0,1}$ from the input image $I_{IN}$ in which the region to be inpainted $I_T$ is set up S1410.

The fourth image inpainting apparatus 400 may carry out inpainting on the background by inputting the input image $I_{IN}$ in which the region to be inpainted $I_T$ is set up, and the binary image $I_{0,1}$ in the background-related artificial intelligent model, and may generate the background-inpainted image $I_{INP}$ S1420.

When the image file of the object added into the region to be inpainted $I_T$ is inputted S1430, the fourth image inpainting apparatus 400 may carry out inpainting on the object by inputting the image of the object corresponding to the file in the fourth object-related artificial intelligent model, thereby generating the object image $I_{OBJ}$ in which the background region is black-colored, and the object region is nonwhite-colored S1440. In step S1440, the fourth object-related artificial intelligent model may cause the image of the object to be nonwhite-colored after segmentation.

The fourth image inpainting apparatus 400 may cause the background-inpainted image $I_{INP}$ generated in step S1420, and the object image $I_{OBJ}$ generated in step S1440 to overlap each other S1450.

The fourth image inpainting apparatus 400 may generate the output image $I_{OUT}$ by converting the black pixel value corresponding to the background of the object image $I_{OBJ}$ overlapping in step S1450 into the pixel value corresponding to the same position with respect to the background-inpainted image $I_{INP}$ S1460.

The fourth image inpainting apparatus 400 refines the output image $I_{OUT}$, which is generated in step S1460, S1470.

According to various exemplary embodiments of the present invention as described above, the present invention may carry out inpainting on the object based on the context, or carry out inpainting on the object based on the image file of the object, or in case that the background of the image file of the object is clearly distinguished from the object, inpainting on the object may be omitted. Also, heterogeneity occurring between the inpainted background and another background around it may be solved in such a manner as to carry out inpainting on the background and inpainting on the object independently, and then to cause the images to overlap each other.

Also, the first to fourth image inpainting apparatuses 100 to 400 which carry out the first to fourth image inpainting methods, respectively may be computing apparatuses each comprising one or more processors, a read-only memory (ROM), a random access memory (RAM), a monitor, a keyboard, a mouse, a storage, and a network interface.

In the description above, although it is described that all the constituent elements, which form the exemplary embodiments of the present invention, are combined into one, or operate in a state of being combined with one another, the present invention is not necessarily limited to these exemplary embodiments. That is, all the constituent elements may operate in a state of one or more constituent elements being selectively combined with each other, if this falls within the scope of the purpose of the present invention. Also, all the constituent elements may be embodied into their respective independent hardware, or may be embodied into a computer program having a program module which perform some functions or all the functions mixed in one piece or a plurality pieces of hardware in a state of some or all of the constituent elements being mixed selectively. Codes and code segments which form the computer program could easily be derived by those having ordinary skill in the technical field of the present invention. This computer program may be saved in a computer readable media, may be readable and may be executed by a computer so that the exemplary embodiments of the present invention can be embodied.

Meanwhile, although the present invention has been described and illustrated with reference to the preferable exemplary embodiments for exemplarily presenting the technical idea of the present invention, the present invention isn't limited to only the elements and operations as illustrated and described herein, and those skilled in the art will clearly understand that various modifications and variations with respect to the present invention can be made without deviating from the category of the technical idea. Accordingly, all the appropriate modifications and variations, and equivalents should be regarded as belonging into the scope of the present invention. Accordingly, the real scope of technical protection of the present invention should be decided by the technical idea of the appended claims.

The invention claimed is:

1. An image inpainting apparatus, comprising:
one or more processors; and
one or more memories storing instructions that, when executed by the one or more processors, cause the apparatus to:
generate a background-inpainted image by carrying out inpainting on a background with respect to an input image in which a region to be inpainted is set up;
generate an object image by carrying out inpainting on an object; and
generate an output image by causing the background-inpainted image and the object image, which are generated, to overlap each other,
wherein the generating the object image including generating the object image by inputting a context comprising information about a kind and attribute of the object added into the region to be inpainted in an object-related artificial intelligent model, and carrying out inpainting on the object.

2. The image inpainting apparatus of claim 1, further comprising generating a binary image by dividing the input image into the region to be inpainted, and a region not to be inpainted, wherein the generating a background-inpainted image further comprises carrying out inpainting on the background by inputting the input image in which the region to be inpainted is set up, and the binary image in a background-related artificial intelligent model.

3. The image inpainting apparatus of claim 1, wherein the generating the object image includes inputting the context in the object-related artificial intelligent model, thereby generating the object image in which a background region is black-colored, and an object region is nonwhite-colored.

4. The image inpainting apparatus of claim 3, wherein the generating the output image including causing the background-inpainted image and the object image to overlap each other so that the object of the object image is located in the region to be inpainted with respect to the background-inpainted image, and including generating the output image by replacing a black pixel value of the background region with respect to the object image by a pixel value of the background-inpainted image.

5. The image inpainting apparatus of claim 1, wherein the generating the object image comprises:
generating the object image in which the background and the object are nonwhite-colored by inputting the context in the object-related artificial intelligent model; and
generating an image (hereinafter referred to as "an object-masked image") in which the background region with respect to the object image generated is black-colored, and the object region is masked in a gray level.

6. The image inpainting apparatus of claim 5, wherein the generating the output image comprises:
making the background-inpainted image and the object-masked image overlap each other so that the object image and the object-masked image are located in the region to be inpainted with respect to the background-inpainted image;
calculating a red-green-blue (RGB) pixel value of the object-masked image using a pixel value of the object with respect to the object image generated from the object generation part, a pixel value of the object-masked image generated from the masking part, and a pixel value of the region to be inpainted; and
generating the output image by replacing the pixel value of the object-masked image by the RGB pixel value.

7. An image inpainting apparatus, comprising:
one or more processors; and
one or more memories storing instructions that, when executed by the one or more processors, cause the apparatus to:
generate a background-inpainted image by carrying out inpainting on a background with respect to an input image in which a region to be inpainted is set up;
generate an object image by carrying out inpainting on an object; and
generate an output image by causing the background-inpainted image and the object image, which are generated, to overlap each other,
wherein the generating the object image includes inputting an image file of the object in the object-related artificial intelligent model when the image file of the object added into the region to be inpainted is inputted, thereby generating the object image in which the background region is black-colored, and the object region is nonwhite-colored.

8. The image inpainting apparatus of claim 7, wherein the generating the output image includes generating the output image by replacing the black pixel value of the background region with respect to the object image by the pixel value of the region to be inpainted after carrying out overlapping so that the object of the object image is located in the region to be inpainted with respect to the background-inpainted image.

9. An image inpainting method, comprising:
  step (A) in which an electronic apparatus generates a background-inpainted image by carrying out inpainting on a background with respect to an input image in which a region to be inpainted is set up;
  step (B) in which the electronic apparatus generates an object image by carrying out inpainting on an object; and
  step (C) in which the electronic apparatus generates an output image by making the background-inpainted image generated in said step (A), and the object image generated in said step (B) overlap each other,
  wherein said step (B) shows generating the object image by inputting a context comprising information about a kind and attribute of the object added into the region to be inpainted in an object-related artificial intelligent model, and carrying out inpainting on the object.

10. The image inpainting method of claim 9, further comprising step (D) in which the electronic apparatus generates a binary image by dividing the input image into a region to be inpainted, and a region not to be inpainted before said step (A),
  wherein said step (A) shows carrying out inpainting on the background by inputting the input image in which the region to be inpainted is set up, and the binary image in a background-related artificial intelligent model.

11. The image inpainting method of claim 9, wherein said step (B) shows inputting the context in the object-related artificial intelligent model, thereby generating the object image in which a background region is black-colored, and an object region is nonwhite-colored.

12. The image inpainting method of claim 11, wherein said step (C) comprises:
  step (C1) of causing the background-inpainted image and the object image to overlap each other so that the object of the object image is located at a position of the region to be inpainted with respect to the background-inpainted image; and
  step (C2) of generating the output image by replacing a black pixel value of the background region with respect to the object image by a pixel value of the background-inpainted region.

13. The image inpainting method of claim 9, wherein said step (B) comprises:
  a step of inputting the context in the object-related artificial intelligent model, thereby generating the object image in which the background and the object are nonwhite-colored; and
  a step of generating an object-masked image in which the background region with respect to the generated object image is black-colored, and the object region is masked in a gray level.

14. The image inpainting method of claim 13, wherein said step (C) comprises:
  step (C1) of causing the background-inpainted image and the object-masked image to overlap each other so that the object image and the object-masked image are located in the region to be inpainted with respect to the background-inpainted image;
  step (C2) of calculating an RGB pixel value using a pixel value of the object with respect to the object image generated from the object generation part, and a pixel value of the object-masked image generated from the masking part; and a pixel value of the region to be inpainted; and
  step (C3) of generating the output image by replacing the pixel value of the object-masked image by the RGB pixel value.

15. The image inpainting method of claim 9, wherein said step (B) shows inputting an image file of the object in the object-related artificial intelligent model when the image file of the object added into the region to be inpainted is inputted, thereby generating the object image in which the background region is black-colored, and the object region is nonwhite-colored.

16. The image inpainting method of claim 15, wherein said step (C) shows generating the output image by replacing the black pixel value of the background region with respect to the object image by the pixel value of the region to be inpainted after carrying out overlapping so that the object of the object image is located at a position of the region to be inpainted with respect to the background-inpainted image.

* * * * *